(12) United States Patent
Lu et al.

(10) Patent No.: US 10,401,973 B2
(45) Date of Patent: Sep. 3, 2019

(54) FOLDABLE PORTABLE KEYBOARD

(71) Applicants: DEXIN ELECTRONIC LTD., Dongguan Guangdong (CN); DEXIN CORPORATION, New Taipei (TW)

(72) Inventors: Ho-Lung Lu, New Taipei (TW); Wang-Dong Cheng, New Taipei (TW)

(73) Assignees: DEXIN ELECTRONIC LTD., Dongguan, Guangdong (CN); DEXIN CORPORATION, New Taipei (TW)

( * ) Notice: Subject to any disclaimer, the term of this patent is extended or adjusted under 35 U.S.C. 154(b) by 166 days.

(21) Appl. No.: 15/794,375

(22) Filed: Oct. 26, 2017

(65) Prior Publication Data

US 2019/0129514 A1 May 2, 2019

(51) Int. Cl.
*G06F 3/02* (2006.01)

(52) U.S. Cl.
CPC .......... *G06F 3/0221* (2013.01); *G06F 3/0216* (2013.01)

(58) Field of Classification Search
CPC ..................................................... G06F 3/0221
USPC ......................................................... 400/472
See application file for complete search history.

(56) References Cited

U.S. PATENT DOCUMENTS

| | | | | |
|---|---|---|---|---|
| 5,463,925 A | * | 11/1995 | Galocy | G10C 3/12 400/682 |
| 5,574,481 A | * | 11/1996 | Lee | B41J 5/10 341/22 |
| 6,552,281 B2 | * | 4/2003 | Katakami | G06F 3/0221 200/5 A |
| 6,991,389 B2 | | 1/2006 | Mochizuki et al. | |
| 8,539,705 B2 | * | 9/2013 | Bullister | G06F 1/1615 345/1.1 |
| 2003/0048205 A1 | * | 3/2003 | He | G06F 1/162 341/26 |
| 2004/0151527 A1 | * | 8/2004 | Sitalasai | G06F 1/1632 400/472 |
| 2006/0274045 A1 | * | 12/2006 | Stenbroten | G06F 3/0219 345/168 |

FOREIGN PATENT DOCUMENTS

| | | |
|---|---|---|
| CN | 205405431 U | 7/2016 |
| TW | I260661 | 8/2006 |

* cited by examiner

*Primary Examiner* — Anthony H Nguyen
(74) *Attorney, Agent, or Firm* — Li & Cai Intellectual Property (USA) Office

(57) ABSTRACT

A foldable portable keyboard includes a first input module, a second input module, a connecting unit and a handgrip unit. The first input module has opposing front and back faces, and opposing first and second ends. The second input module has opposing front and back faces, and opposing first and second ends. The connecting unit is configured to be connected to the first end of the first input module and the first end of the second input module. The handgrip unit is configured to be engaged to the second end of the first input module and the second end of the second input module. The first input module and the second input module are configured to be in a flat configuration or in a folded configuration.

10 Claims, 12 Drawing Sheets

FOLDABLE PORTABLE KEYBOARD

BACKGROUND OF THE INVENTION

1. Field of the Invention

The present invention relates to a keyboard; in particular, to a foldable portable keyboard.

2. Description of Related Art

With the development of science and technology, the users who attempt to utilize various peripheral devices (such as keyboards) may have different requirements. For example, to meet the needs for information input and portability, there are scaled-down keyboards on the market, but their sizes are not ergonomic and may lead to a mistyping a key scenario to users.

Currently, there are foldable full-size keyboards available on the market, but their hinge mechanisms are often complex, which increases the costs as well as the risk of malfunction after multiple uses, and they are inconvenient to carry around.

In this regard, the present invention provides a solution to overcome the aforementioned drawbacks.

SUMMARY OF THE INVENTION

An object of the present invention is to provide a foldable portable keyboard that can overcome the aforementioned drawbacks.

In one aspect/configuration of a foldable portable keyboard according to the present disclosure, the foldable portable keyboard comprises a first input module, a second input module, a connecting unit and a handgrip unit. The first input module has opposing front and back faces, and opposing first and second ends. The front face of the first input module is provided with a plurality of keys. The second input module has opposing front and back faces, and opposing first and second ends. The front face of the second input module is provided with a plurality of keys. The connecting unit is configured to be connected to the first end of the first input module and the first end of the second input module. The handgrip unit is configured to be engaged to the second end of the first input module and the second end of the second input module. The first input module and the second input module are configured to be in a flat configuration or in a folded configuration. The front face of the first input module and the front face of the second input module are kept away from each other and coplanar when the first input module and the second input module are in the flat configuration. The front face of the first input module and the front face of the second input module are close to and facing each other when the first input module and the second input module are in the folded configuration, and the handgrip unit is engaged to the second end of the first input module and the second end of the second input module.

For the foldable portable keyboard provided by the present invention, since the first end of the first input module and the first end of the second input module can be connected together through the connecting unit, it thereby allows the first input module and the second input module to be in either a folded or a flat configuration. When folded, the second end of the first input module and the second end of the second input module can be connected through the handgrip unit, making the keyboard easy to carry.

In order to further the understanding regarding the present invention, the following embodiments are provided along with illustrations to facilitate the disclosure of the present invention.

DETAILED DESCRIPTION OF THE PREFERRED EMBODIMENTS

Figure 1:
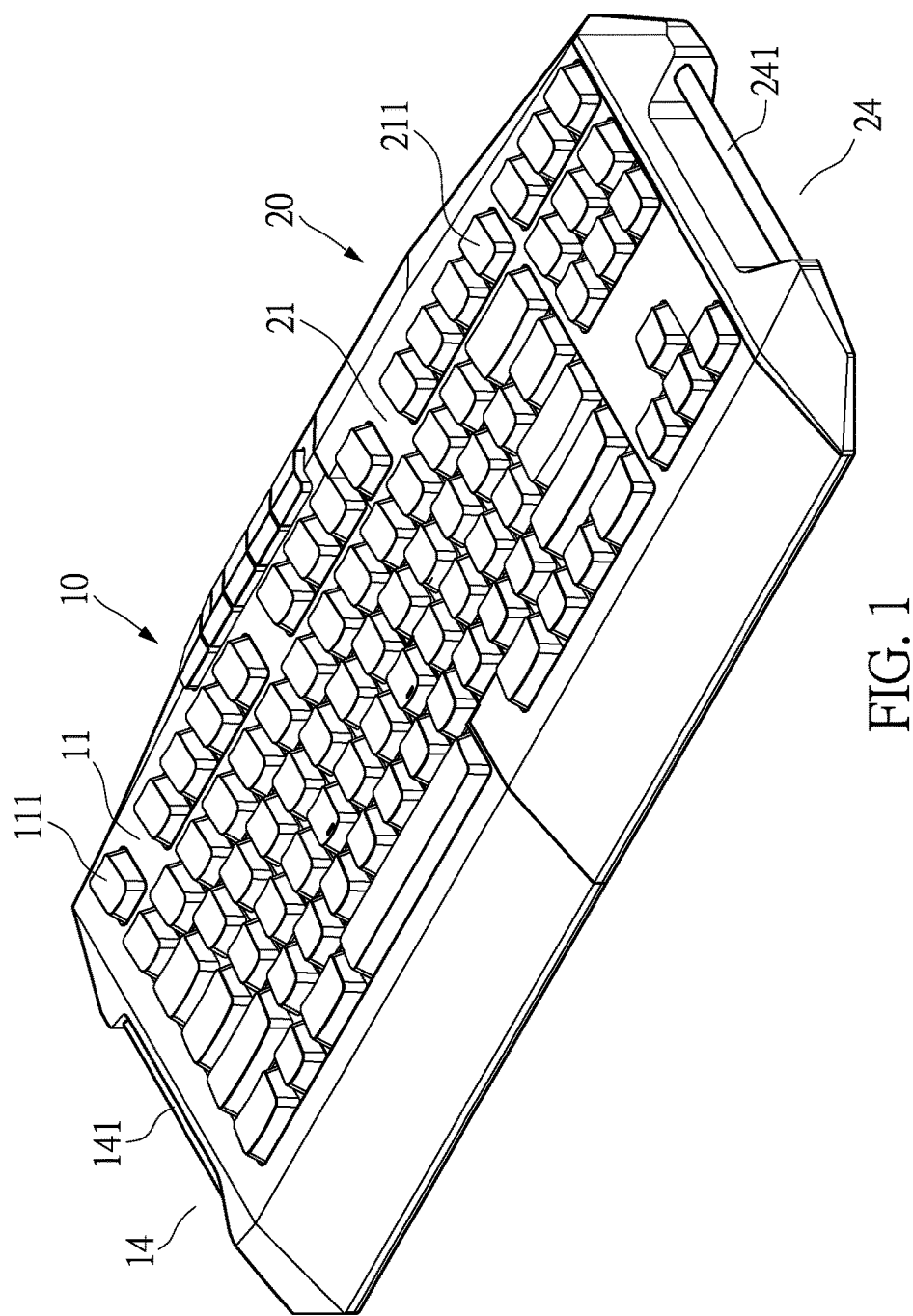
FIG. 1 shows a perspective view of a foldable portable keyboard in a flat configuration according to a first embodiment of the present invention.

The aforementioned illustrations and following detailed descriptions are exemplary for the purpose of further explaining the scope of the present invention. Other objectives and advantages related to the present invention will be illustrated in the subsequent descriptions and appended drawings.

First Embodiment

Refer to FIGS. 1 to 7. The foldable portable keyboard provided in accordance with the first embodiment of the present invention includes a first input module 10, a second input module 20, and a connecting unit 30. The foldable portable keyboard of the present embodiment may also include a handgrip unit 40 and a base unit 50, which will be described later in detail.

The first input module 10 has a front face 11 and an opposing back face 12, as well as opposing first and second ends 13, 14. The front face 11 of the first input module 10 is provided with a plurality of keys 111. Likewise, the second input module 20 has a front face 21 and an opposing back face 22, as well as opposing first and second ends 23, 24. The front face 21 of the second input module 20 is provided with a plurality of keys 211.

The connecting unit 30 is configured to be connected to the first end 13 of first input module 10 and the first end 23 of second input module 20.

Figure 2:
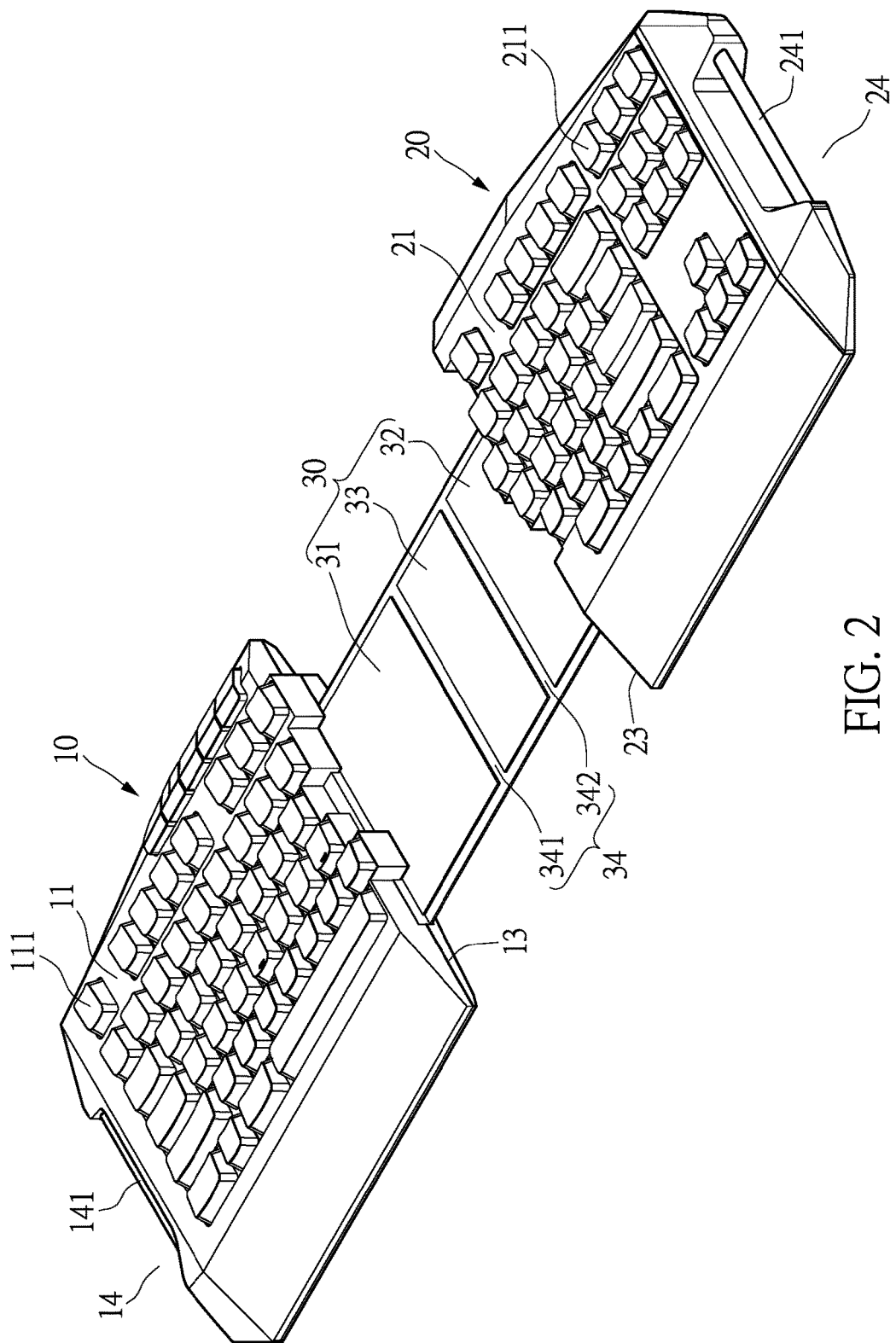
FIG. 2 shows a perspective view (1) of the foldable portable keyboard in an extended configuration according to the first embodiment of the present invention.

In particular, the opposing ends of the connecting unit 30 have a first telescopic section 31 and a second telescopic section 32, respectively. As shown in FIGS. 1 and 2, the first telescopic section 31 can retract and protrude from the first end 13 of first input module 10 in a sliding manner, while the second telescopic section 32 can retract and protrude from the first end 23 of second input module 20 in a sliding manner. Therefore, through the connecting unit 30, the first input module 10 and the second input module 20 of the keyboard can be pulled apart horizontally, thereby increasing the overall length of the keyboard.

Figure 4:
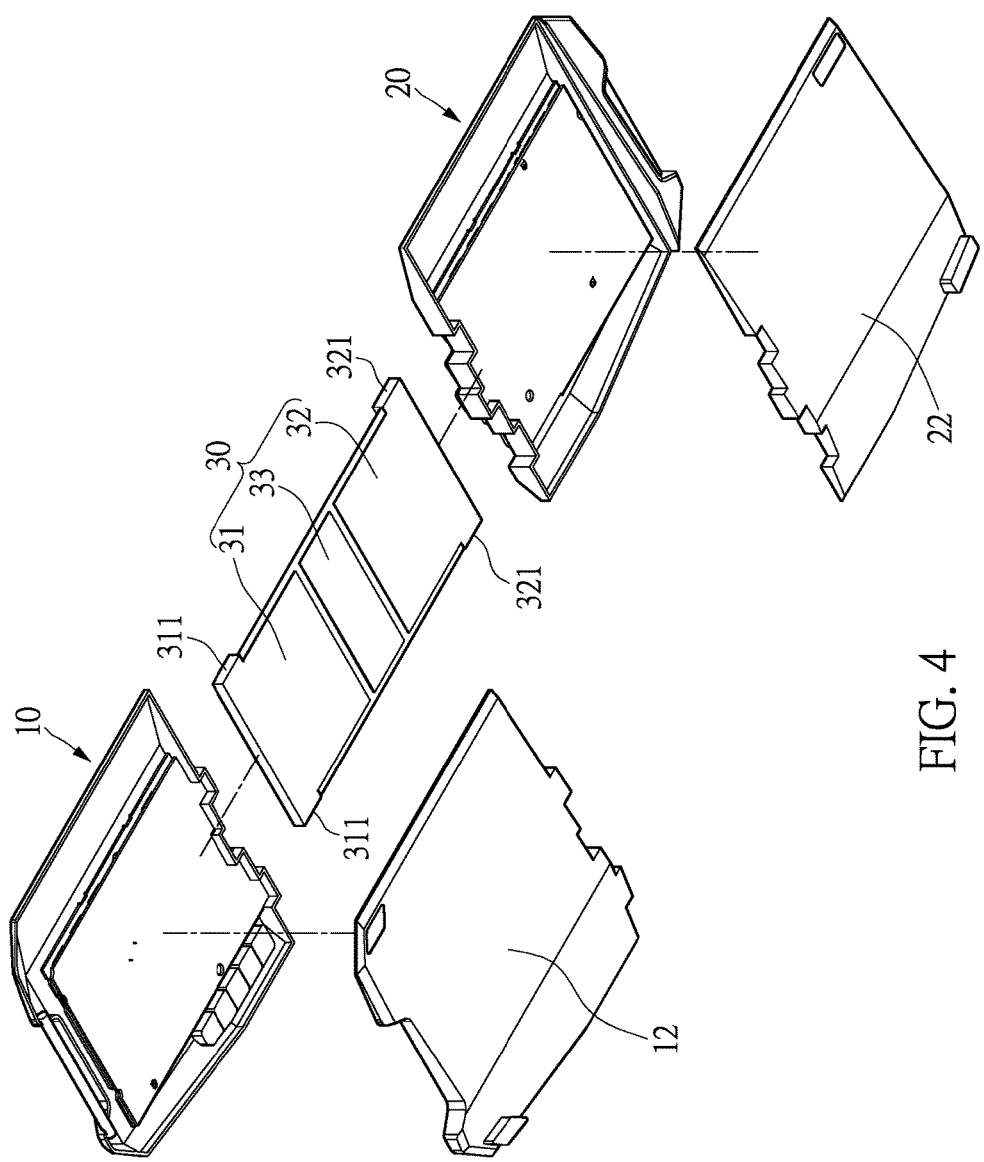
FIG. 4 shows a partially exploded view of the foldable portable keyboard according to the first embodiment of the present invention.

In addition, as shown in FIG. 4, at opposing side edges of the first telescopic section 31 corresponding to the first input module 10, two opposing stopper blocks 311 are respectively provided to prevent the first telescopic section 31 from sliding out of the first end 13 of the first input module 10. Likewise, at opposing side edges of the second telescopic section 32 corresponding to the second input module 20, two opposing stopper blocks 321 are respectively provided to prevent the second telescopic section 32 from sliding out of the first end 23 of the second input module 20.

Figure 5:
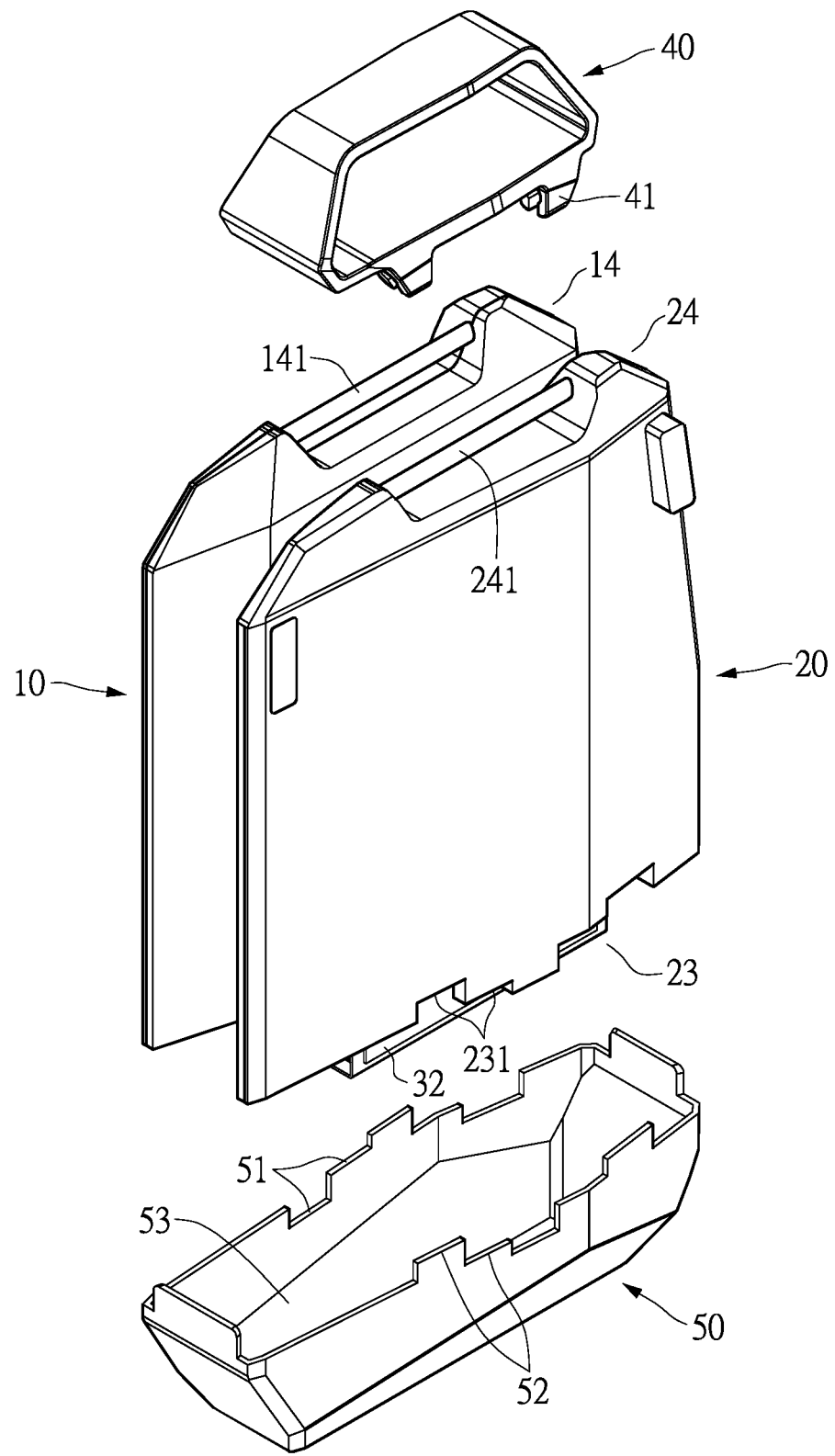
FIG. 5 shows a perspective view (1) of the foldable portable keyboard in a folded configuration with a handgrip unit and a base unit according to the first embodiment of the present invention.
Figure 6:
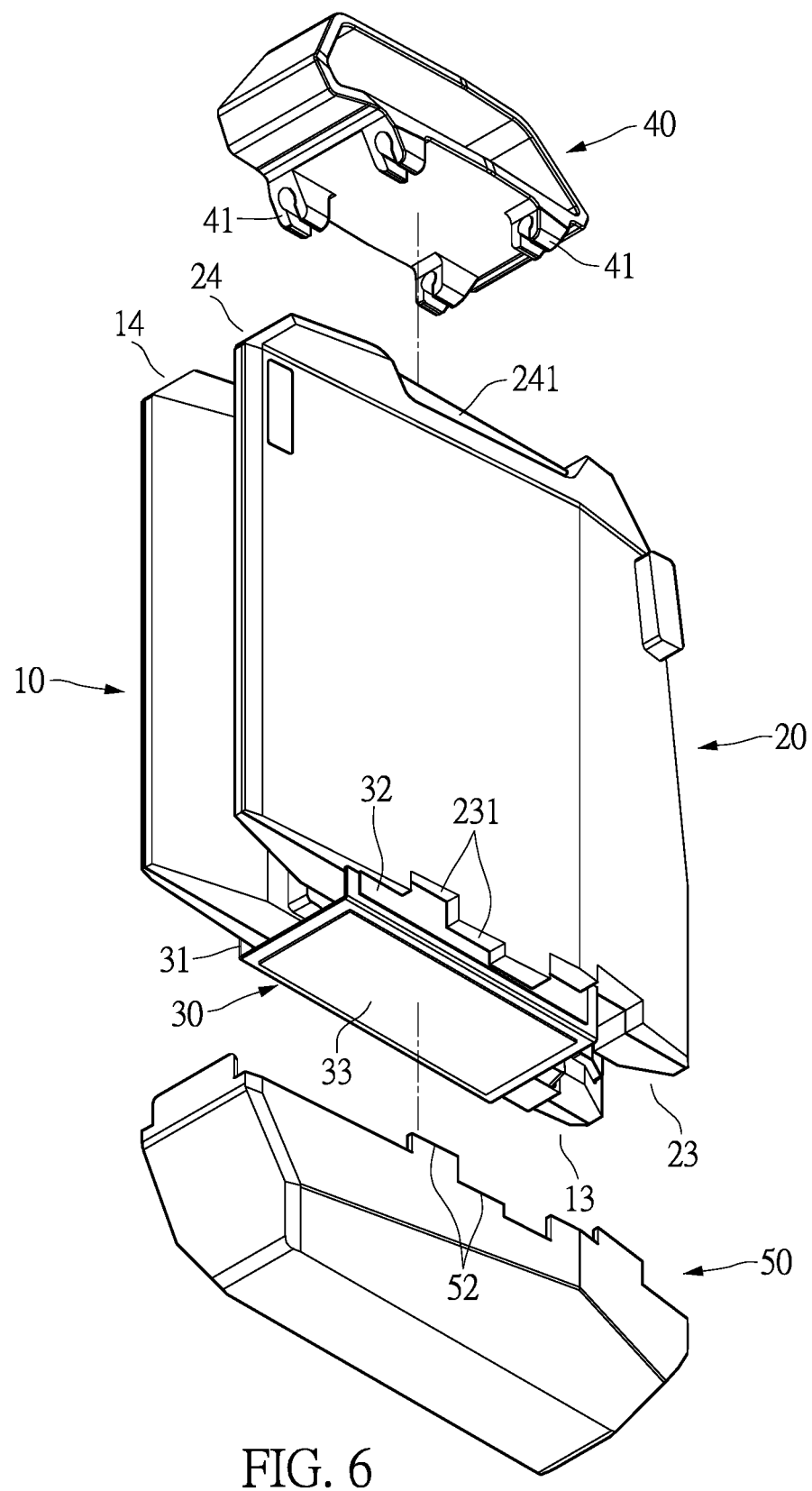
FIG. 6 shows a perspective view (2) of the foldable portable keyboard in the folded configuration with the handgrip unit and the base unit according to the first embodiment of the present invention.

There is a connecting portion 33 located between the first telescopic section 31 and the second telescopic section 32, and the first telescopic section 31 and the second telescopic section 32 are movably connected to opposing sides of the connecting portion 33, respectively. As shown in FIGS. 5 and 6, the first telescopic section 31 and the second telescopic section 32 can be folded upward with respect to the connecting portion 33.

In detail, the first telescopic section 31, the second telescopic section 32 and the connecting portion 33 are jointly covered by the outer skin 34 (as shown in FIG. 2), and the outer skin 34 forms the first fold line 341 and the second fold line 342. The first fold line 341 is located between the first telescopic section 31 and the connecting portion 33, and the second fold line 342 is located between the second telescopic section 32 and the connecting portion 33, which allows the first telescopic section 31 and the second telescopic section 32 can be folded upwardly along the first fold line 341 and the second fold line 342, thereby making the connecting unit 30 substantially U-shaped. Hence, the first input module 10 and the second input module 20 of the keyboard can be folded upward through the connecting unit 30 to be in a folded configuration.

Figure 3:
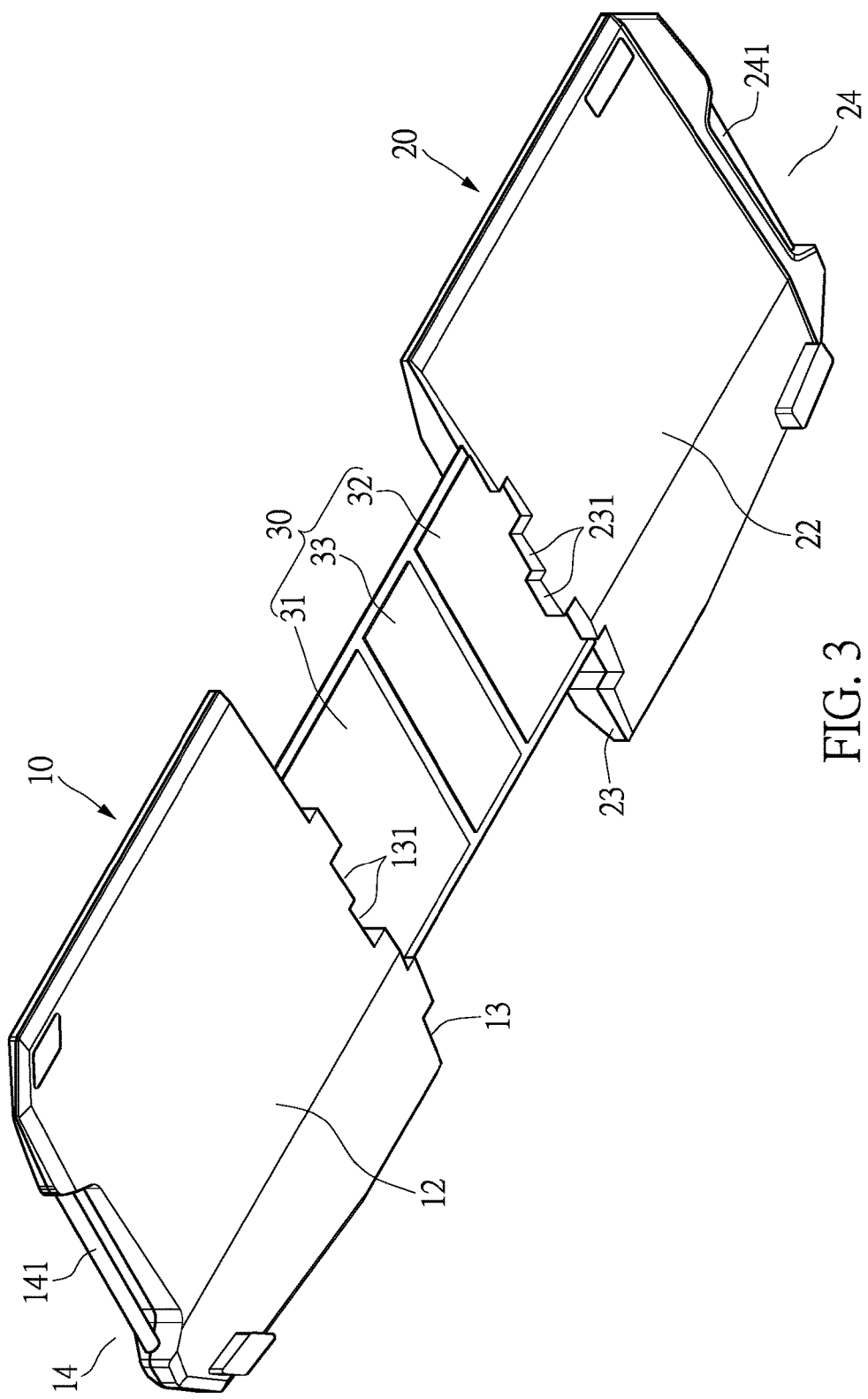
FIG. 3 shows a perspective view (2) of the foldable portable keyboard in the extended configuration according to the first embodiment of the present invention.

Therefore, as described above, through the connecting unit 30, the first input module 10 and the second input module 20 of the keyboard in the present embodiment may be in a flat configuration (as shown in FIG. 1), in an extended configuration (as shown in FIGS. 2 and 3), or in a folded configuration (as shown in FIGS. 5 and 6).

Furthermore, as shown in FIG. 3, a first positioning portion 131 can be disposed at the first end 13 of the first input module 10, and the second positioning portion 231 can be disposed at the first end 23 of the second input module 20. The first positioning portion 131 and the second positioning portion 231 are corresponding positioning structures configured to engage each other, and the first positioning portion 131 and the second positioning portion 231 can coordinate the position each other. The first positioning portion 131 can be a recessed portion, a protruding portion, or a partially recessed and partially protruding portion of any shape. The second positioning portion 231 can likewise be a recessed portion, a protruding portion, or a partially recessed and partially protruding portion of any shape. Therefore, the two uneven positioning portions can be positioned against each other, achieving ideal positioning when the first end 13 of the first input module 10 is engaged with the first end 23 of the second input module 20.

Figure 7:
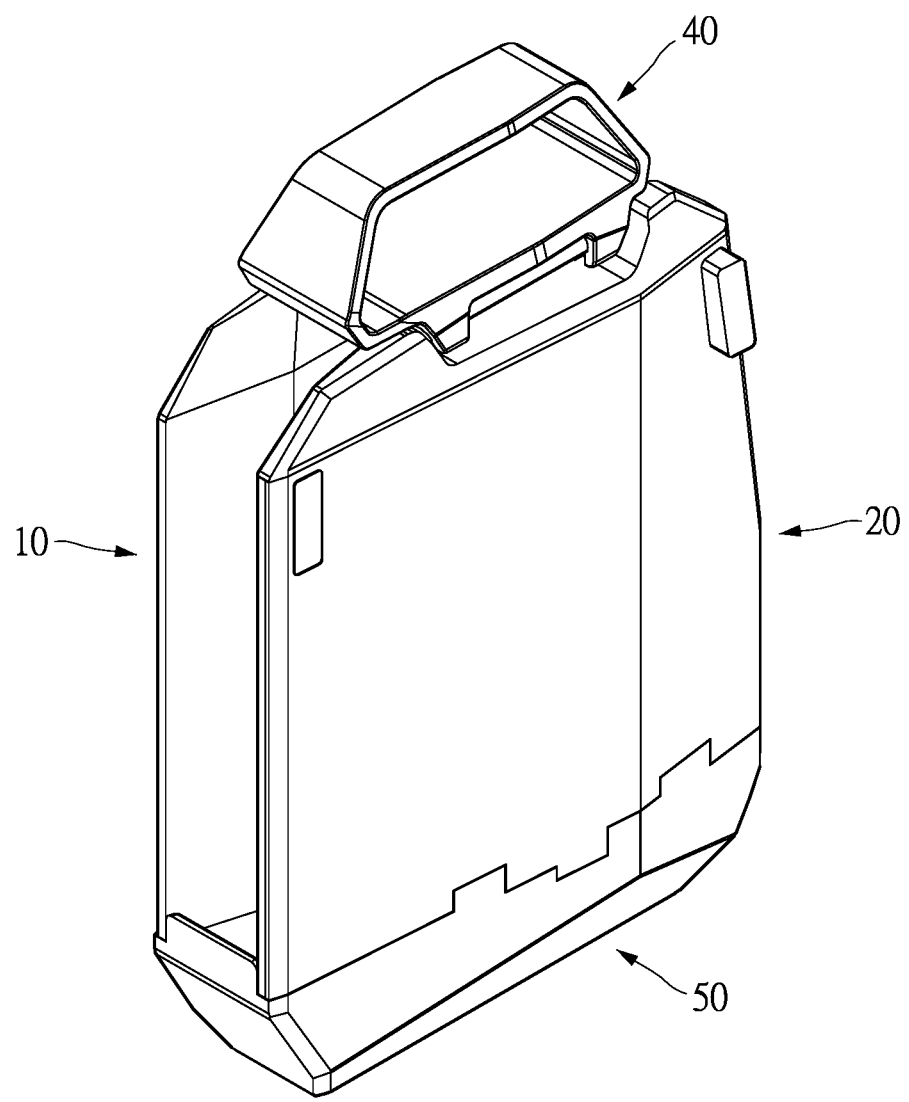
FIG. 7 shows a perspective view of the foldable portable keyboard ready for carrying according to the first embodiment of the present invention.

When carried, as shown in FIGS. 5, 6, and 7, the handgrip unit 40 can be engaged to the second end 14 of first input module 10 and the second end 24 of second input module 20, such that the keyboard in a folded configuration can be easily carried. In addition, the base unit 50 can be engaged to the first end 13 of first input module 10 and the first end 23 of second input module 20, such that the keyboard in a folded configuration can be easily placed upright.

In detail, a plurality of fastening elements 41 can be disposed at the bottom of the handgrip unit 40, and each fastening element 41 can be a C-shaped fastener. The second end 14 of the first input module 10 has a first connecting portion 141, and the second end 24 of the second input module 20 has a second connecting portion 241. The first connecting portion 141 and the second connecting portion 241 can both be a connecting column, allowing the fastening elements 41 to be snapped onto the first connecting portion 11 and the second connecting portion 241, respectively.

Furthermore, a third positioning portion 51 and a fourth positioning portion 52 can be disposed at the upper edge of the base unit 50. The third positioning portion 51 and the first positioning portion 131 are corresponding positioning structures configured to engage each other, and the fourth positioning portion 52 and second positioning portion 231 are corresponding positioning structures configured to engage each other. That is, the third positioning portion 51 can be an uneven positioning portion corresponding to the first positioning portion 131, and the fourth positioning portion 52 can likewise be an uneven positioning portion corresponding to the second positioning portion 231, achieving ideal positioning when the base unit 50 is engaged with the first end 13 of the first input module 10 and the first end 23 of the second input module 20. The base unit 50 is also recessed to form a chamber 53, enabling the USB cable (not shown) of the keyboard to be winded around the connecting portion 33 and stored inside the chamber 53.

Second Embodiment

Figure 8:
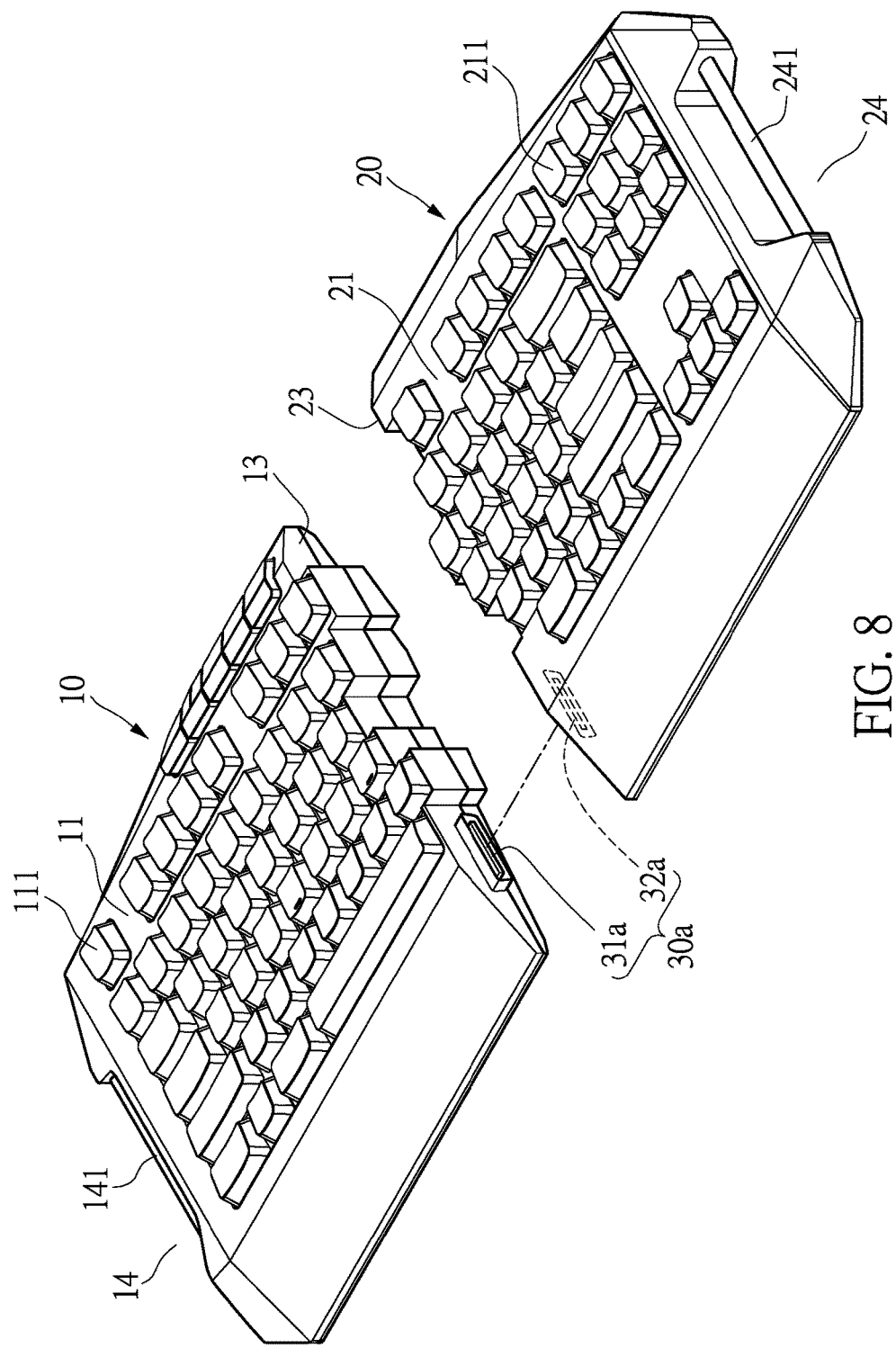
FIG. 8 shows a perspective view of a foldable portable keyboard in a detached configuration according to a second embodiment of the present invention.
Figure 9:
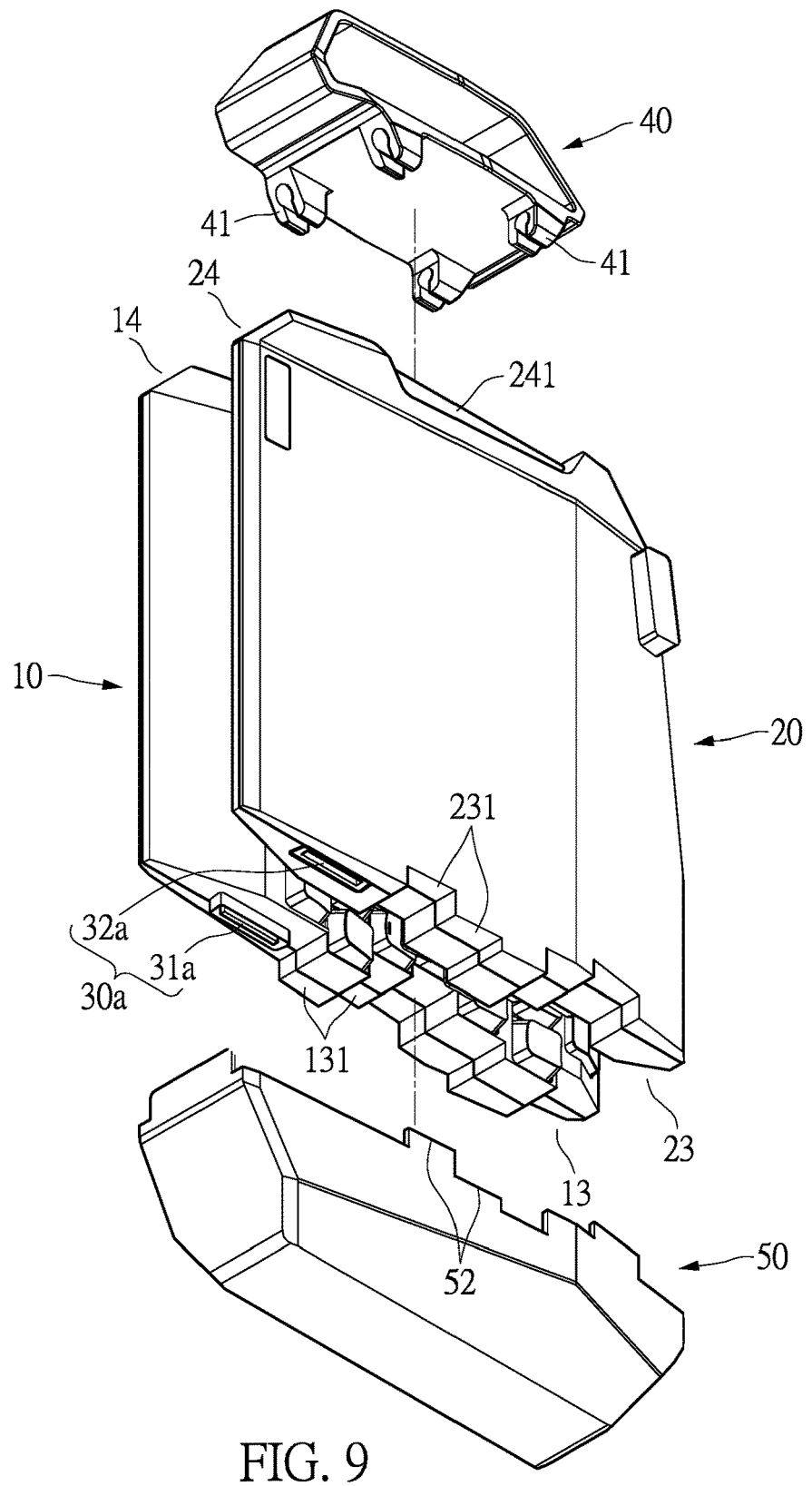
FIG. 9 shows a perspective view of the foldable portable keyboard in a folded configuration with a handgrip unit and a base unit according to the second embodiment of the present invention.

Refer to FIGS. 8 and 9 for the second embodiment of the present invention. In the present embodiment, the connection unit 30a includes a first connector 31a and a second connector 32a, the first connector 31a is disposed at the first end 13 of the first input module 10, the second connector 32a is disposed at the first end 23 of the second input module 20, and the first connector 31a and the second connector 32a are detachably connected to each other, so that the first input module 10 and the second input module 20 can be connected to each other or separated from each other. The first input module 10 and the second input module 20 can be connected to each other, and the front face 11 of the first input module 10 and the front face 21 of the second input module 20 can be kept away from each other and coplanar when the first input module 10 and the second input module 20 are in a flat configuration. The first input module 10 and the second input module 20 can be separated from each other, and the front face 11 of the first input module 10 and the front face 21 of the second input module 20 can be close to and face each other when the first input module 10 and the second input module 20 are in a folded configuration. Thereafter, the handgrip unit 40 can be engaged to the second end 14 of first input module 10 and the second end 24 of second input module 20, while the base unit 50 can be engaged to the first end 13 of the first input module 10 and the first end 23 of the second input module 20, making the keyboard easy to carry and place.

Third Embodiment

Figure 10:
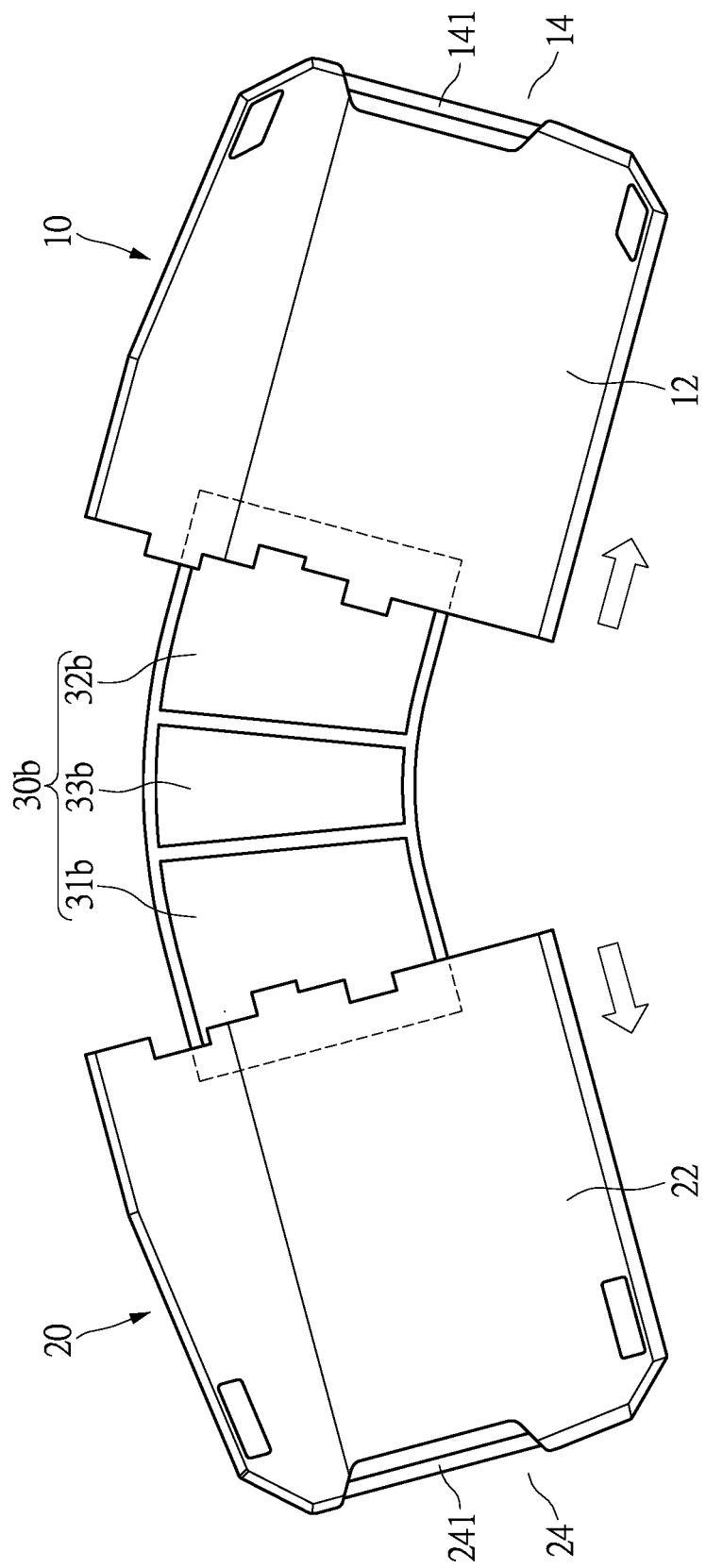
FIG. 10 shows a plan view of a foldable portable keyboard in an extended configuration according to a third embodiment of the present invention.

Refer to FIG. 10 for the third embodiment of the present invention. In the present embodiment, the connecting unit 30b has a first telescopic section 31b, a second telescopic section 32b, and a connecting portion 33 located between the first telescopic section 31b and the second telescopic section 32b. The connecting unit 30b is arced, so when the first input module 10 and the second input module 20 of the keyboard are pulled away from each other, the first input module 10 and the second input module 20 of the keyboard can form an arc-shaped structure, which is more ergonomic when typing.

Fourth Embodiment

Figure 11:
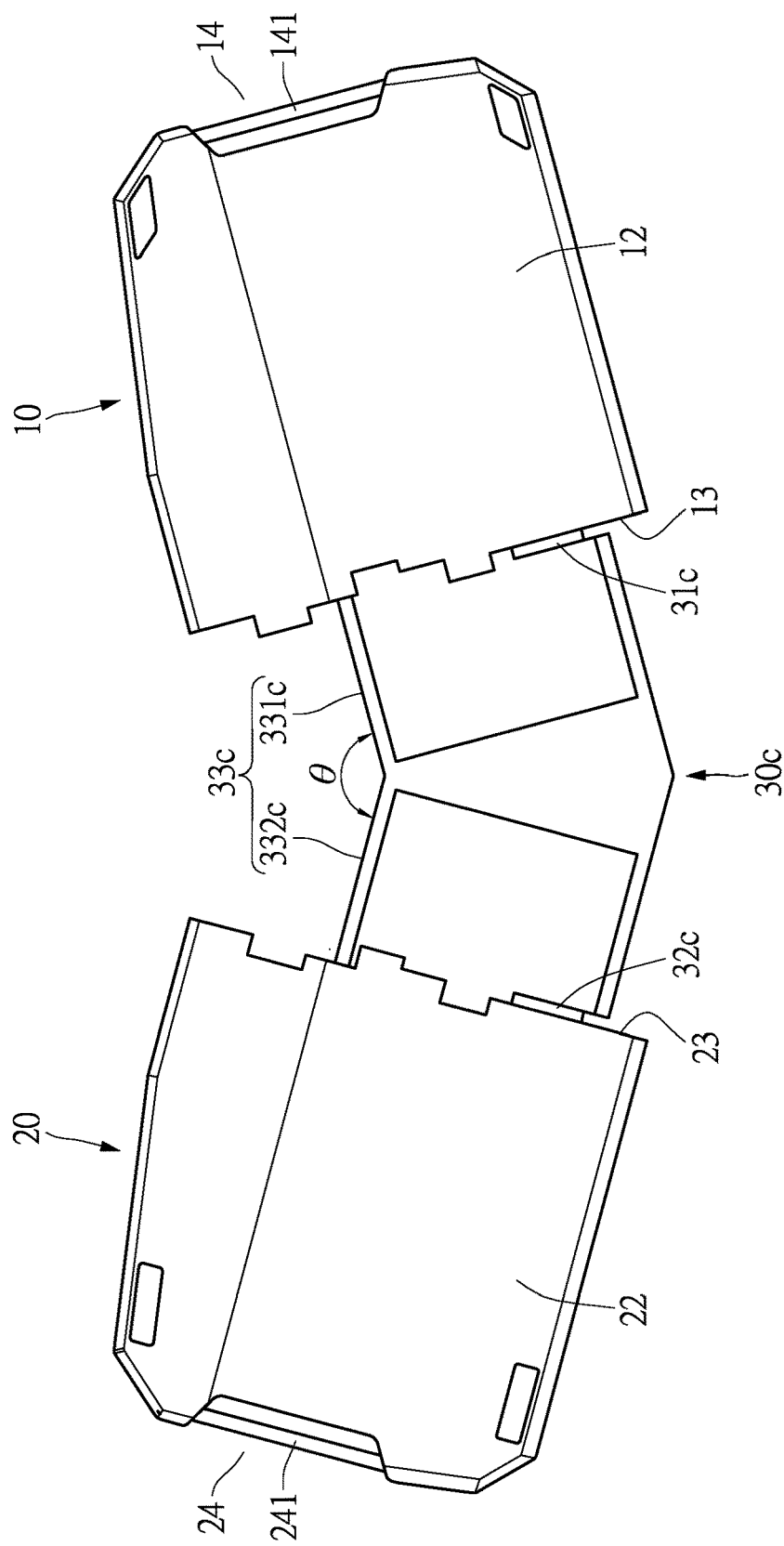
FIG. 11 shows a plan view of a foldable portable keyboard in an extended configuration according to a fourth embodiment of the present invention.

Refer to FIG. 11 for the fourth embodiment of the present invention. In the present embodiment, the connection unit 30c includes a first connector 31c, a second connector 32c, and a connecting plate 33c. The first connector 31c is disposed at the first end 13 of the first input module 10, the second connector 32c is disposed at the first end 23 of the second input module 20, and two ends of the connecting plate 33c are detachably connected to the first connector 31c and the second connector 32c, respectively. Furthermore, the connecting plate 32c is bent to have a first plate 331 and a second plate 332 connected to each other. The angle between the first plate 331 and the second plate 332 is 0. An obtuse angle may be formed between the first plate 331 and the second plate 332. In other embodiments, the first plate 331 and the second plate 332 may form a right angle therebetween, so different user needs can be satisfied by simply switching to different connecting plates with different angles.

Fifth Embodiment

Figure 12:
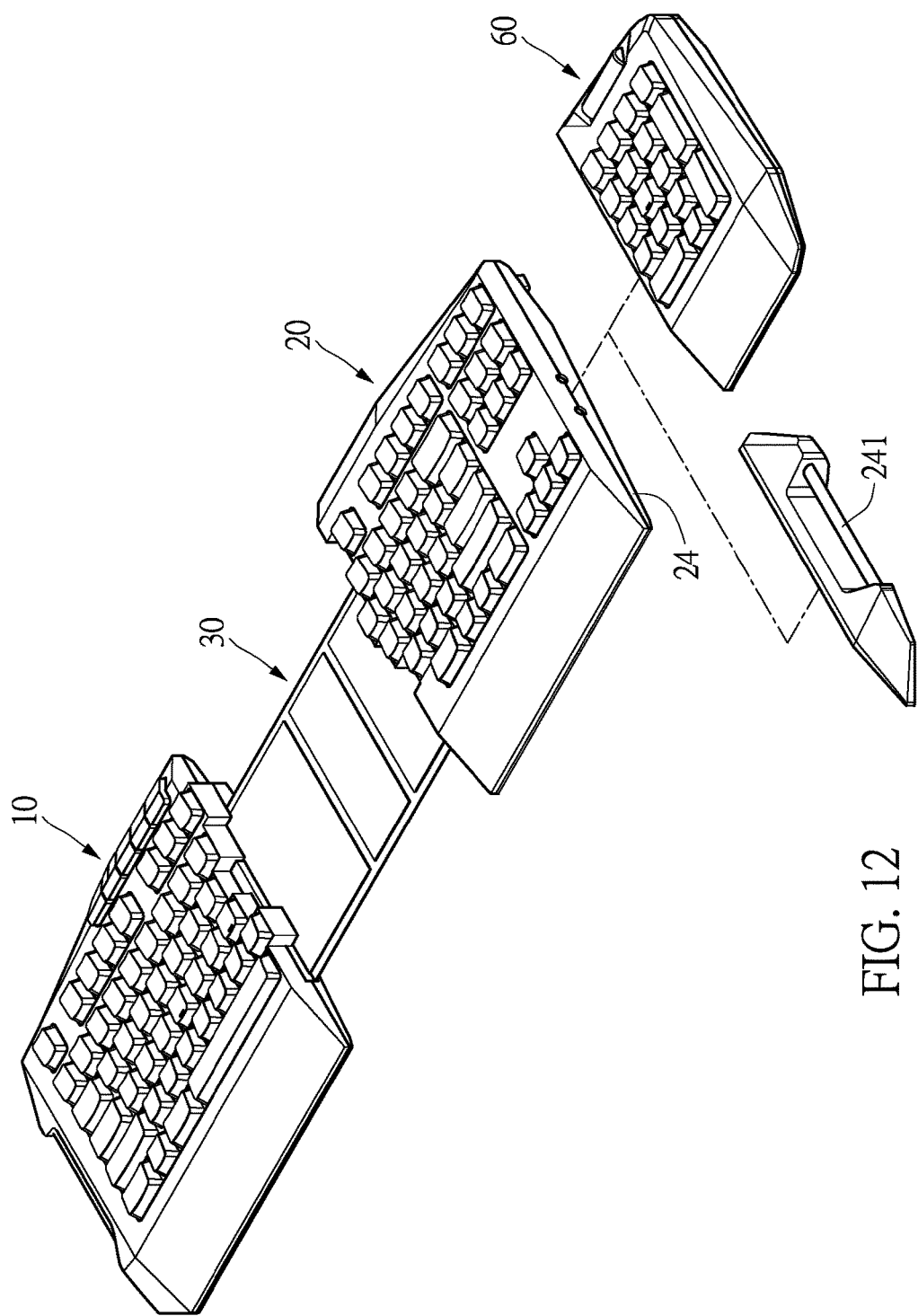
FIG. 12 shows a perspective view of a foldable portable keyboard with a third input module according to a fifth embodiment of the present invention.

Refer to FIG. 12 for the fifth embodiment of the present invention. In the present embodiment, the keyboard can further include a third input module 60 and the third input module 60 can be an independent numeric key module. Furthermore, the third input module 60 can be coupled to the second end 24 of the second input module 20 when the second connecting portion 241 is detached from the second input module 20, making the keyboard easy to operate.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A foldable portable keyboard, comprising:
   a first input module having opposing front and back faces, and opposing first and second ends, wherein the front face of the first input module is provide with a plurality of keys;
   a second input module having opposing front and back faces, and opposing first and second ends, wherein the front face of the second input module is provided with a plurality of keys;
   a connecting unit configured to be connected to the first end of the first input module and the first end of the second input module; and
   a handgrip unit configured to be engaged to the second end of the first input module and the second end of the second input module;
   wherein the first input module and the second input module are configured to be in a flat configuration or in a folded configuration;
   wherein the front face of the first input module and the front face of the second input module are kept away from each other and coplanar when the first input module and the second input module are in the flat configuration;
   wherein the front face of the first input module and the front face of the second input module are close to and facing each other when the first input module and the second input module are in the folded configuration, and the handgrip unit is engaged to the second end of the first input module and the second end of the second input module.

2. The foldable portable keyboard according to claim 1, wherein the connecting unit has a first telescopic section and a second telescopic section, the first telescopic section is configured to retract and protrude from the first end of the first input module in a sliding manner, and the second telescopic section is configured to retract and protrude from the first end of the second input module in a sliding manner.

3. The foldable portable keyboard according to claim 2, wherein the first telescopic section is provided with two opposing stopper blocks at opposing side edges thereof, and the second telescopic section is provided with two opposing stopper blocks at opposing side edges thereof.

4. The foldable portable keyboard according to claim 2, wherein a connecting portion is located between the first telescopic section and the second telescopic section, the first telescopic section and the second telescopic section are movably connected to opposing sides of the connecting portion, respectively, and the first telescopic section and the second telescopic section are folded upward with respect to the connecting portion when the first input module and the second input module are in the folded configuration.

5. The foldable portable keyboard according to claim 4, wherein the first telescopic section, the second telescopic section and the connecting portion are jointly covered by an outer skin, and the outer skin forms a first fold line and a second fold line, the first fold line is located between the first telescopic section and the connecting portion, and the second fold line is located between the second telescopic section and the connecting portion so as to allow the first telescopic section and the second telescopic section to be folded upwardly along the first fold line and the second fold line.

6. The foldable portable keyboard according to claim 1, further comprising a base unit, wherein the base unit is configured to be engaged to the first end of the first input module and the first end of the second input module when the first input module and the second input module are in the folded configuration.

7. The foldable portable keyboard according to claim 6, wherein the base unit is recessed to form a chamber.

8. The foldable portable keyboard according to claim 1, wherein a first positioning portion is disposed at the first end of the first input module, a second positioning portion is disposed at the first end of the second input module, and the first positioning portion and the second positioning portion coordinate the position each other.

9. The foldable portable keyboard according to claim 8, wherein a plurality of fastening elements are disposed at a bottom of the handgrip unit, the second end of the first input module has a first connecting portion, and the second end of the second input module has a second connecting portion so as to allow the plurality of fastening elements to be snapped onto the first connecting portion and the second connecting portion, respectively.

10. The foldable portable keyboard according to claim 2, wherein the connecting unit is arced such that the first input module and the second input module can form an arc-shaped structure when the first input module and the second input module are pulled away from each other.

* * * * *